April 16, 1963   V. DI BENEDETTO   3,085,648
WRECKING TRUCK

Filed Oct. 11, 1960   2 Sheets-Sheet 1

INVENTOR.
Vincenzo Di Benedetto
BY Kelman and Berman
Agents

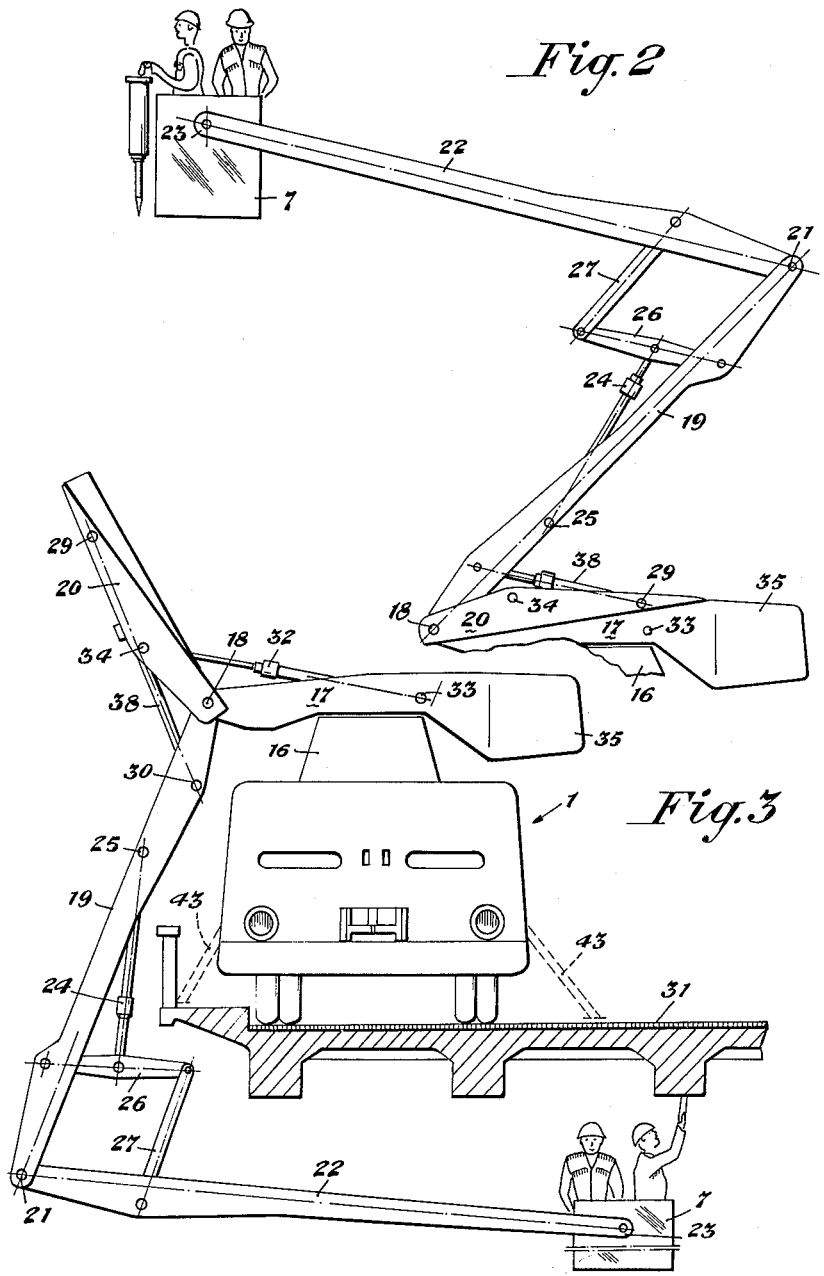

United States Patent Office 3,085,648
Patented Apr. 16, 1963

3,085,648
WRECKING TRUCK
Vincenzo Di Benedetto, 4 Via Eugenio Vaina,
Rome, Italy
Filed Oct. 11, 1960, Ser. No. 61,876
Claims priority, application Italy May 17, 1960
5 Claims. (Cl. 182—2)

This invention refers to an improved wrecking truck and more particularly, to a wrecking truck fitted with various equipment to perform military or civil works on roads, railroads, harbors, hydroelectric installations, industrial buildings, towers, trestles, trolley installations and the like, or for photographic and observational activities in war time. The equipment truck of the present invention can be suitably armoured when intended for work in military areas or in war operations; in this case the operator or operators which have to control the equipment installed in the truck operate from a special armoured cab which protects them from rifle or machine gun bullets or splinters.

The present equipped truck permits the carrying out of many different operations which would otherwise be only possible by using various individual and separate mechanical equipment, each controlled by a different operator.

A particular feature of the present truck consists in an apparatus for hydraulically lifting working platforms or turrets, in other words, an apparatus that permits the bringing of the said platform or turrets to all the points of a spherical space having is centre in the main point of support of said apparatus, i.e. the working platform or turret can be shifted into every location both above and beneath said point of support, this being particularly advantageous for operations to be performed on the bottom face of bridges, viaducts and the like; in this case the equipped truck and consequently the point of support is located on the roadway, while the operator platform moves below it. This permits, in peace and at war, to quickly reach structures which would otherwise be only accessible by such conventional means as ladders, ropes, scaffoldings and the like, with a much greater danger and expense of time and labor; this also permits the facilitation of various operations, such as the erection and disassembling of bridging material, repair, reinforcement and corrections of already existing bridges, welding and cutting of metal members, maintenance of vaults, tunnels, viaducts and the like; said device renders it also possible to lay mines in wartime, and to its movable end a convenient mine removing appendage can be fitted.

The device can be mounted on wheels, tracks, or travel on rails, or can be provided as a stationary installation. It is driven by an internal combustion engine or an electric motor and in its armoured version, it comprises an interior space for the driver and crew.

In addition to the already mentioned movable working platform, the truck comprises a series of equipment and installations also controlled by a single operator stationed aboard the truck, and essentially comprising: a bucket or shovel, for diggings in soil in open land or the demolition of structures; a detachable angledozer blade for earth movements and similar work, and to remove obstacles from a track or road; a power winch to haul means, craft or to haul down erect structures and plants; a generator to supply electric power to the equipment and lighting installations; an air compressor to drive pneumatic hammer drills, wrecking hammers and other compressed air tools; a hydraulic pump to drive the various hydraulic equipment, and mainly the hydraulic jacks of the shovel, the angledozer blade and the said apparatus with a movable working platform; an electric equipment for the welding and cutting of metal structures and a mobile plant for electric lighting.

The present truck may be provided with a trailer, which may also be armoured and similarly mounted on wheels, tracks or rails; said trailer is intended to carry the material necessary for the work to be performed, such as explosives, fillers, binders and various tools.

The multipurpose truck according to the present invention will be better understood from the following description of one of its embodiments, given by way of example, with reference to the attached drawings, wherein:

FIG. 2 is a lateral view of the movable platform device in a partially lifted position; and FIG. 3 is a front view of the truck, with the movable platform device folded to reach below a bridge's intrados.

Figure 1:
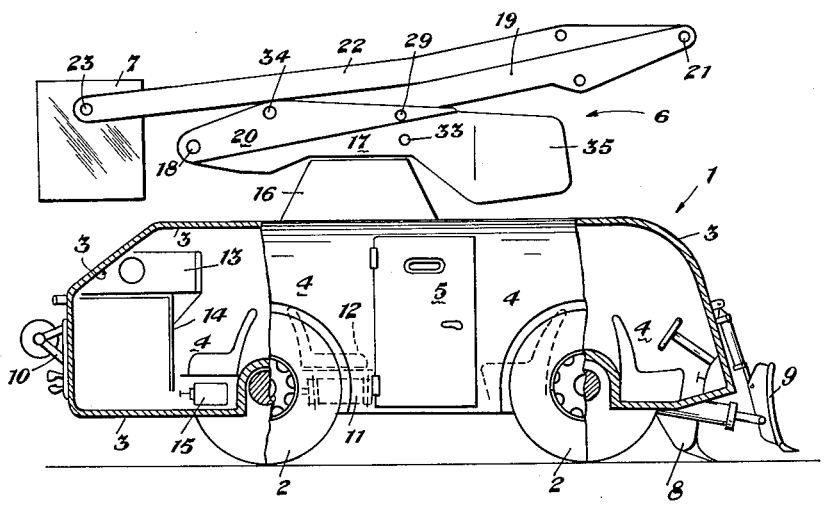
FIG. 1 is a partial section of an embodiment of the invention, with the device carrying the movable working platform and the other equipment are folded up in the rest position.

As shown in FIG. 1, the truck equipped according to the present invention comprises a vehicle generally indicated with 1, mounted on wheels 2 and provided with an eventually armoured body 3, which encloses an interior space 4 for the driver and crew, accessible through a lateral door 5. Inside the truck body 3 are arranged various units and installations controlled by the operator by conventional means. In the embodiment shown in FIG. 1, these installations are the universal lifting device generally indicated with 6, capable of bringing a working platform 7 to any point within a given radius; a power shovel 8, located below the front end of said truck; a detachable, hydraulically operated angledozer blade 9, also mounted frontally; a power winch 10 in the back of said truck, an electric generator 11, mounted under the crew's seats in a central position; an air compressor 13, mounted overhead on suitable frames 14; and a hydraulic pump 15, installed under the rear seats. It is understood that all this equipment is powered and controlled through conventional means and located and installed in the most convenient manner, and that both their number and location in the truck can be varied with respect to the above described example of arrangement. As shown in FIGS. 1 to 3, the universal lifting device, generally indicated by 6, is rotatably mounted on a support 16 provided atop the truck. The horizontal rotation of the base 17 of the lifting device 6 around support 16 is obtained by any known means, such as by a center pintle and roller track and controlled by any known type of driving mechanism and therefore needs no further description. The base 17 is in metal, and forms a hollow container which can be weighted in 35.

To a common pivot 18 in the opposite end of base 17 are hinged, with one of their respective ends: an auxiliary arm 20, whose purpose will be subsequently described, and a main arm 19, whose purpose will also be subsequently described.

To a pivot 21, provided at the opposite end of the main arm 19, is articulated a secondary arm 22. On the opposite, forked end of said secondary arm, is freely suspended by means of trunnions 23, a working platform or turret 7, which can be locked in the desired angular position.

Both the main and the secondary arm can be tubular beams or, as in the embodiment represented, each arm, including the auxiliary, consists in a composite beam.

In FIG. 1 the lifting device is shown in its rest position, in which the arms 19, 20 and 22 are folded up. In order to change from this into the operating position shown in FIG. 2, arm 22 is rotated around 21 by means of hoisting, such as a double-acting hydraulic jack 24 whose cylinder is fulcrumed in 25 to arm 19, while its piston rod is fulcrumed to lever 26. Lever 26 is pivoted with one end to arm 19, its other end being pivoted to lever 27, and this in turn to the secondary arm 22. Thus, levers 26 and 27 form with arms 19 and 22 an articulated parallelogram, through which the hydraulic jack 24 controls the movements of arm 22 over an angle of approximately 180°, with respect to arm 19.

The rotation of the main arm 19 around its pivot is brought about over an angle of approx. 130°, with respect to the horizontal base 17, by the double-acting jack 38, whose cylinder is hinged to the auxiliary arm 20 in 29 and whose piston is fulcrumed to main arm 19 at a point 30. In the hitherto described movements of both the main and the secondary arm, the auxiliary arm 20 did not change its position relatively to the other members. These movements, such as the rotation of the base around its support, and the sweeps of the main and the secondary arm within the ranges described, are also obtainable in other known types of elevators.

The increase in reach up to an angle of 260° of the present lifting device is attained by the novel feature of the auxiliary arm and the arrangements of the actuating means interposed between it, the main arm 19 and the base 17. In fact, it is this feature of the universal lifting device which permits to extend its reach to the entire space lying below the support 16.

The function of said auxiliary arm 20 clearly results from FIG. 3, showing how it lifts the working platform 7 below the road-way 31 of a bridge. The auxiliary arm 20 is rotated around 18, up to a maximum angle of approx. 130°, by actuating the hydraulic jack 32, whose cylinder is hinged to the revolving base 17 in 33 and whose piston is hinged to said auxiliary arm in 34. This rotation results in the displacement point 29, in which the jack 38 actuating the main arm 19 is pivoted, along an equal angle.

Thus, if the main arm 19, before the actuation of jack 32, had been forming for instance an angle of 130° with the auxiliary arm 20—and thus with the base 17—when the former was in its position of rest, a rotation of 130° of the auxiliary arm around its fulcrum 18 will sweep the main arm 19 around the same fulcrum 18 to reach a 260° angle with respect to the horizontal base 17.

From this position of the main arm 19, the secondary arm 22, and consequently the working platform or turret 7 can be maneuvered into any position within the space existing below support 16, by acting upon jack 24. By known electric, hydraulic or mechanical controls, the arms can also be directed from the working platform 7, by the personnel operating on it. Or else, the personnel manning the platform can communicate their orders to operators stationed in the truck by a telephonic insulation.

The working platform or turret 7 is so suspended on the forked end of arm 22, that its centre of gravity, when manned, lies under its points of suspension formed by the trunnions 23. By this provision, or by means of a chain drive and sprockets, it will always maintain its horizontal position, regardless of the relative positions of the other components of the universal lifting device. Once it has been swung into its final working location, the platform or turret may be locked in place, for instance, by tightening nuts threaded on said trunnions.

In the embodiment shown, base 17 is shaped into a container, with a special end space 35 to hold a counterweight. In the smaller sized models, the drive for the hydraulic pump feeding all three jacks 24, 32, and 28 and the revolving of the base around support 16 can be derived from the truck engine. In larger size universal lifters, the jacks will be directly actuated by an extra motor pump unit located in said end space 35, the motor being connected to an electric generator in the truck.

The truck may be additionally provided with extensible lateral props or stays to widen its base of support and thus increase its lateral stability.

What I claim is:
1. A lifting device comprising, in combination:
    (a) a support;
    (b) a base member mounted on said support;
    (c) a main arm and an auxiliary arm, said arms being elongated and each having one longitudinal end portion pivoted to said base member;
    (d) a secondary elongated arm having one longitudinal end portion hingedly secured to the other longitudinal end portion of said main arm, said secondary arm having a free end portion;
    (e) working platform means on said free end portion; and
    (f) a plurality of jack means interposed between said base member and said arms for actuating movement of said platform means between a position in which said platform means is above said support, and another position in which said platform means is beneath said support, said plurality of jack means including
        (1) first jack means interposed between said base member and the other end portion of said auxiliary arm,
        (2) second jack means interposed between the other end portion of said auxiliary arm and said other end portion of said main arm, and
        (3) third jack means interposed between said other end portion of said main arm and said free end portion of said secondary arm for actuating pivotal movement of said arms relative to each other and relative to said base member,
        (4) at least one of said first and second jack means being adapted to pivot said auxiliary arm through an angle substantially greater than 90 degrees.

2. A device as set forth in claim 1, said base member being rotatable on said support member about a vertically extending axis.

3. A device as set forth in claim 1, wherein said main arm and said auxiliary arm are pivoted to said base member for rotary movement about a common axis.

4. A device as set forth in claim 1, wherein at least one of said jack means is a double acting hydraulic jack.

5. A lifting device comprising, in combination:
    (a) a support member;
    (b) a base member rotatable on said support member about a vertically extending axis;
    (c) a main arm and an auxiliary arm, said arms being elongated and each having one longitudinal end portion pivoted to said base member for movement about a common pivoting axis transverse of said vertically extending axis;
    (d) a secondary elongated arm having one longitudinal end portion hingedly secured to the other longitudinal end portion of said main arm, said secondary arm having a free end portion;
    (e) working platform means on said free end portion; and
    (f) fluid-actuated jack means interposed between said base member and said arms for actuating movement of said platform means between a position in which said platform means is above said support, and another position in which said platform means is beneath said support, said jack means including
        (1) a first jack interposed between a portion of said base member spaced from said pivoting axis and the other end portion of said auxiliary arm for pivoting said auxiliary arm relative to said base member through an angle substantially greater than 90 degrees, (2) a second jack interposed between said other end portion of said auxiliary arm and said other end portion of said main arm for pivoting said main arm relative to said auxiliary arm through an angle substantially greater than 90 degrees, and (3) a third jack interposed between said other end portion of said main arm and said free end portion of said secondary arm for actuating movement of said secondary arm relative to said main arm.

References Cited in the file of this patent

UNITED STATES PATENTS

| | | |
|---|---|---|
| 1,147,607 | Chisko | July 20, 1915 |
| 2,220,650 | Herzog | Nov. 5, 1940 |
| 2,616,768 | Stemm | Nov. 4, 1952 |
| 2,669,490 | Kaufman | Feb. 16, 1954 |
| 2,815,250 | Trump | Dec. 3, 1957 |
| 2,881,030 | Troche | Apr. 7, 1959 |
| 2,996,195 | Hansen | Aug. 15, 1961 |
| 2,996,196 | Podlesak | Aug. 15, 1961 |

FOREIGN PATENTS

| | | |
|---|---|---|
| 846,399 | Great Britain | Aug. 31, 1960 |